United States Patent
Nejadmalayeri et al.

(10) Patent No.: US 8,916,813 B2
(45) Date of Patent: Dec. 23, 2014

(54) BACKGROUND-FREE BALANCED OPTICAL CROSS CORRELATOR

(75) Inventors: Amir Hossein Nejadmalayeri, Toronto (CA); Franz X. Kaertner, Hamburg (DE)

(73) Assignee: Massachusetts Institute of Technology, Cambridge, MA (US)

( * ) Notice: Subject to any disclaimer, the term of this patent is extended or adjusted under 35 U.S.C. 154(b) by 294 days.

(21) Appl. No.: 13/613,257

(22) Filed: Sep. 13, 2012

(65) Prior Publication Data

US 2013/0206969 A1 Aug. 15, 2013

Related U.S. Application Data

(60) Provisional application No. 61/533,981, filed on Sep. 13, 2011.

(51) Int. Cl.
G01J 1/04 (2006.01)
G01J 1/42 (2006.01)
G01J 5/08 (2006.01)
G01J 11/00 (2006.01)

(52) U.S. Cl.
CPC ............... *G01J 1/0425* (2013.01); *G01J 11/00* (2013.01)
USPC ................................. 250/227.11; 250/227.14

(58) Field of Classification Search
CPC ........ H04L 7/042; H04J 3/0608; G01J 11/00; G01J 1/0425
USPC ............... 250/227.11, 214.1, 214 R, 214 DC, 250/227.14; 385/115, 116, 100, 15
See application file for complete search history.

(56) References Cited

U.S. PATENT DOCUMENTS

| | | | |
|---|---|---|---|
| 6,956,652 B2 | 10/2005 | Whitbread et al. | |
| 2002/0156592 A1* | 10/2002 | Taira et al. | 702/66 |
| 2009/0296749 A1* | 12/2009 | Sucha et al. | 372/6 |
| 2010/0045974 A1 | 2/2010 | Kaertner et al. | |

OTHER PUBLICATIONS

Laughton, F. R., et al., "Very Sensitive Two-Photon Absorption GaAs/AlGaAs Waveguide Detector for an Autocorrelator", Electronics Letters, vol. 28, No. 17 (1992), pp. 1663-1665.
Laughton, Frances R., et al., "The Two-Photon Absorption Semiconductor Waveguide Autocorrelator", IEEE J. of Quantum Electronics, vol. 30, No. 3 (1994), pp. 838-845.
Moutzouris, K., et al., "Second-harmonic generation through optimized modal phase matching in semiconductor waveguides", Applied Physics Letters, vol. 83, No. 4 (Jul. 28, 2003), pp. 620-622.

(Continued)

*Primary Examiner* — Francis M Legasse, Jr.
(74) *Attorney, Agent, or Firm* — Modern Times Legal; Robert J. Sayre (57) ABSTRACT

A balanced optical cross correlator includes an optical waveguide, a first photodiode including a first n-type semiconductor and a first p-type semiconductor positioned about the optical waveguide on a first side of the optical waveguide's point of symmetry, and a second photodiode including a second n-type semiconductor and a second p-type semiconductor positioned about the optical waveguide on a second side of the optical waveguide's point of symmetry. A balanced receiver including first and second inputs is configured to produce an output current or voltage that reflects a difference in currents or voltages, originating from the first and the second photodiodes of the balanced cross correlator and fed to the first input and to the second input of the balanced receiver.

19 Claims, 5 Drawing Sheets

(56) References Cited

OTHER PUBLICATIONS

Yu, X., et al., "Efficient continuous wave second harmonic generation pumped at 1.55 μm in quasi-phasematched AlGaAs waveguides", Optics Express, vol. 13, No. 26 (2005), pp. 10742-10748.

Abolghasem, P., et al., "Type-0 second order nonlinear interaction in monolithic waveguides of isotropic semiconductors", Optics Express, vol. 18, No. 12 (2010), pp. 12681-12689.

Popovic, Milos A., et al., "Global design rules for silicon microphotonic waveguides: sensitivity, polarization and resonance tunability", Conference on Lasers and Electro-Optics (CLEO) paper CTuCC1 (2006), pp. 1-2.

Liu, Ansheng, et al., "Optical Amplification and Lasing by Stimulated Raman Scattering in Silicon Waveguides", Journal of Lightwave Technology, vol. 24 (Mar. 3, 2006), pp. 1440-1455.

Watts, Michael R., et al., "Low-Voltage, Compact, Depletion-Mode, Silicon Mach-Zehnder Modulator", Journal of Selected Topics in Quantum Electronics, vol. 16 (2010), pp. 159-164.

Khilo, Anatol, et al., "Broadband linearized silicon modulator", Optics Express, vol. 19 (2011), pp. 4485-4500.

Cox, J.A., et al. "Complete characterization of quantum-limited timing jitter in passively mode-locked fiber lasers", Optics Letters, vol. 35, No. 20_(Oct. 15, 2010), pp. 3522-3524.

Cox, Jonathan A., et al., "Sub-Femtosecond Timing Distribution of an Ultrafast Optical Pulse Train over Multiple Fiber Links", Optical Society of America (OSA) (2008), pp. 1-2.

European Patent Office, International Search Report and Written Opinion for PCT/US2012/055028 (corresponding PCT application) (Dec. 18, 2012).

\* cited by examiner

BACKGROUND-FREE BALANCED OPTICAL CROSS CORRELATOR

RELATED APPLICATION

This application claims the benefit of U.S. Provisional Application No. 61/533,981, filed 13 Sep. 2011, the entire content of which is incorporated herein by reference.

GOVERNMENT SUPPORT

This invention was made with government support under Grant No. DE-SC0005262 awarded by the Department of Energy. The government has certain rights in the invention.

BACKGROUND

Phase noise or timing jitter are the ultimate indicators of the quality of oscillators. The quality of an oscillator, whether harmonic or pulsed, is mostly determined by either of these two parameters. There are well-known techniques for measuring the quality of electrical/microwave oscillators. These methods can, in principle, be applied to optical oscillators, as well. Utilization of electrical and/or microwave oscillator techniques for characterizing the quality of optical oscillators, however, involves generating an electrical signal from its original optical counterpart.

The most common and simplest way of converting from the optical domain to the microwave domain is to apply direct photodetection by shining the optical signal on a photoreceiver. It has been shown, however, that during the direct photodetection process, an excess amount of phase noise can be generated. The cause of this excess phase noise is the power fluctuations of the optical signal that are converted to phase fluctuations through a process called amplitude modulation to phase modulation (AM-PM) conversion.

Balanced optical cross correlation, however, has been shown not only to resolve the AM-PM conversion issue to the first order, but also to effectively increase the sensitivity of the jitter measurement by more than three orders of magnitude.

In U.S. Pat. No. 7,940,390 B2, material birefringence is utilized to make an optical cross correlator. In embodiments described therein, a type-II nonlinear crystal is used for cross correlation where the wavelengths are identical or very close (where wavelength filtering at the output is very difficult or impossible). The nonlinear crystal is formed of a material that is transparent to both fundamental and harmonic frequencies, and the material properties of the nonlinear crystal determines the limit as to what pulsewidth can be used. Furthermore, due to the difference in the material platforms for the cross correlator and the photoreceiver, their integration may be difficult; and, even in the case of integration, the integration may be hybrid and not monolithic.

Two photon absorption in semiconductors have been used in the past to perform autocorrelation function for the purpose of pulse duration measurements [F. Laughton, et al., "Very Sensitive Two-Photon Absorption GaAs/AlGaAs Waveguide Detector for an Autocorrelator", Electronics Letters, Vol. 28, No. 17, 1663-65 (1992); F. Laughton, et al., "The Two-Photon Absorption Semiconductor Waveguide Autocorrelator", IEEE J. of Quantum Electronics, Vol. 30, No. 3, 838-845 (1994); and U.S. Pat. No. 6,956,652 B2 (Whitbread, et al.)]. Modal phase matching in semiconductor guided wave devices have been used to perform second harmonic generation, sum frequency generation, or difference frequency generation [K. Moutzoris, et al., "Second-harmonic generation through optimized modal phase matching in semiconductor waveguides", Applied Physics Letters, Vol. 83, No. 4, 620-22 (2003); X. Yu, et al., "Efficient continuous wave second harmonic generation pumped at 1.55 um in quasi-phase-matched AlGaAs waveguides", Optics Express, Vol. 13, No. 26, 10742-48 (2005); P. Abolghasem, et al., "Type-0 second order nonlinear interaction in monolithic waveguides of isotropic semiconductors", Optics Express, Vol. 18, No. 12, 12681-89 (2010)]. Here, we exploit the fundamental properties of semiconductors and guided wave devices to invent a unique background-free balanced optical cross-correlator.

SUMMARY

Balanced optical cross correlators and methods for their use are described herein. Various embodiments of the apparatus and methods may include some or all of the elements, features and steps described below.

The balanced optical cross correlator can include an optical waveguide including an input end, an output end, and a point of symmetry between the output end and the input end. A first photodiode including a first n-type semiconductor and a first p-type semiconductor is positioned about the optical waveguide on a first side of the optical waveguide's point of symmetry; and a second photodiode including a second n-type semiconductor and a second p-type semiconductor is positioned about the optical waveguide on a second side of the optical waveguide's point of symmetry.

A balanced receiver including a first input and a second input is configured to produce an output current or voltage that reflects a difference in currents or voltages fed to the first input and to the second input. A first electrically conductive pathway couples the first input of the balanced receiver with the first n-type semiconductor or with the first p-type semiconductor; and a second electrically conductive pathway coupling the second input of the balanced receiver with the second n-type semiconductor or with the second p-type semiconductor, depending on the input polarities.

In the case of the balanced receiver having identical input polarities, the second electrically conductive pathway couples the second input of the balanced receiver (a) with the second n-type semiconductor if the first electrically conductive pathway couples the first input with the first p-type semiconductor or (b) with the second p-type semiconductor if the first electrically conductive pathway couples the first input with the first n-type semiconductor. On the other hand, in the case of the balanced receiver having opposite input polarities, the second electrically conductive pathway couples the second input of the balanced receiver (a) with the second n-type semiconductor if the first electrically conductive pathway couples the first input with the first n-type semiconductor or (b) with the second p-type semiconductor if the first electrically conductive pathway couples the first input with the first p-type semiconductor.

In a method for evaluating optical pulses, at least two optical pulses are generated and directed into the input end of an optical waveguide sandwiched between a first n-type semiconductor and a first p-type semiconductor. A first electric current is extracted from the first p-type semiconductor (or from the first n-type semiconductor), and a second electric current is extracted from the second p-type semiconductor (or from the second n-type semiconductor). A difference output is then produced as current or voltage based on the first and second electric currents.

This new balanced optical cross correlator, further described herein, can offer all of the benefits of U.S. Pat. No. 7,940,390 B2 and can also offer the following additional advantages. First, the geometry of the waveguide can be designed to render the modal dispersion as the basis of the operation. Second, the waveguide material need not be transparent to harmonic frequencies. Third, the range of pulse durations that can be successfully used in the device can depend on an adjustable waveguide design, instead of on fixed material properties. Fourth, placing a p-n junction across the waveguide can, effectively, implement a waveguide photodetector; and these waveguide detectors can be monolithically integrated. Fifth, with the waveguides and photoreceivers monolithically integrated, much higher photodetection bandwidths can be achieved. Sixth, the apparatus can be fabricated via conventional semiconductor fabrication techniques, thereby enabling access to existing fabrication facilities and technologies for low-cost fabrication. Seventh, many degrees of freedom exist for engineering the waveguide material composition or waveguide geometry to provide the desired results. Eighth, a variety of amplifiers such as a transimpedance amplifier (TIA), a current amplifier, a voltage amplifier, a limiting amplifier (LIA), a sense amplifier (SA), an operational amplifier (Op Amp), as well as other functional circuitry such as comparators or analog-to-digital (A/D) converters can be either monolithically or hybridly integrated. Ninth, a variety of amplifiers such as a transimpedance amplifier (TIA), a current amplifier, a voltage amplifier, a limiting amplifier (LIA), a sense amplifier (SA), an operational amplifier (Op Amp), as well as other functional circuitry such as comparators or A/D converters can be co-packaged with the balanced cross correlator in a so-called system-on-a-chip (SOC).

BRIEF DESCRIPTION OF THE DRAWINGS

Further, these figures are only for illustrative purposes. It is understood that the difference output in FIGS. 3 and 4 (a balanced optical cross correlator based on second harmonic generation or sum frequency generation) can also be generated in configurations similar to, for example, FIGS. 5-8 and 12-17.

In the accompanying drawings, like reference characters refer to the same or similar parts throughout the different views, and the use of accent marks with reference numbers indicates different editions of the same or similar elements. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not necessarily perfectly pure, as practical and imperfect realities may apply; e.g., the potential presence of at least trace impurities (e.g., at less than 1 or 2% by weight or volume) can be understood as being within the scope of the description; likewise, if a particular shape is referenced, the shape is intended to include imperfect variations from ideal shapes, e.g., due to machining tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Figure 1:
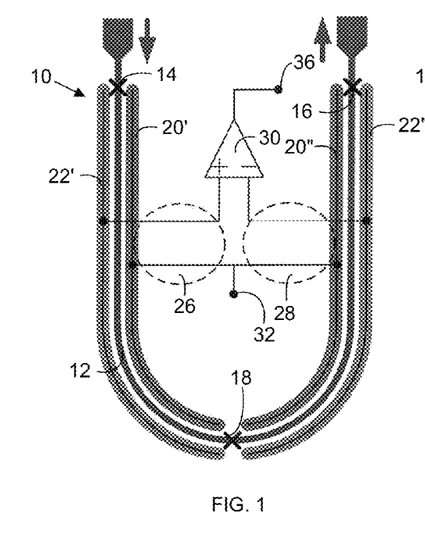
FIG. 1 is a partially schematic illustration of a semiconductor balanced optical cross correlator, the operation of which is based on two-photon absorption.
Figure 3:
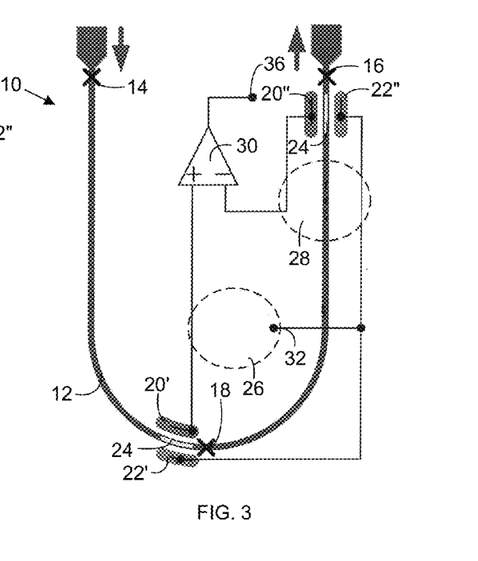
FIG. 3 is a partially schematic illustration of a semiconductor balanced optical cross correlator, the operation of which is based on second-harmonic or sum-frequency generation.

Different embodiments of a semiconductor balanced optical cross correlator 10 are illustrated in FIGS. 1 and 3. In each embodiment, light is input at an input end 14 of an optical waveguide 12 (comprising, e.g., silicon, gallium arsenide, etc.) and extracted from an output end 16 of the optical waveguide 12.

Initially, two optical pulses with a relative timing difference to be measured are projected onto two orthogonal polarizations. The optical pulses can be generated from, e.g., one or two lasers in a configuration with, e.g., a beam-splitter, mirrors, focusing lenses and a half-wave plate in one or more of the optical paths, as shown in U.S. Pat. No. 7,940,390 B2. Coupling of the laser pulses into the optical waveguides can be done by fiber, lensed fiber, grating coupler, taper, etc. The optical waveguide 12 is designed so that the group velocities (GV) of the two polarizations are different. There is a large body of literature explaining in detail how to tailor dispersion by engineering the geometry of the waveguide 12. As an example, see Milos Popovic, Tymon Barwicz, Erich P. Ippen, and Franz X. Kaertner, "Global design rules for silicon microphotonic waveguides: sensitivity, polarization and resonance tunability", Conference on Lasers and Electro-Optics (CLEO) paper CTuCC1 (2006). The laser can be integrated with the said cross correlator, can be co-packaged with the said cross correlator, or can be far, even thousand of kilometers, away from the said cross correlator.

In the configuration of FIG. 1, for example, tailoring the waveguide dimension enables control the mode group index ($n_g$), and the group velocity $v_g=c/n_g$, where c is the speed of light in vacuum. Consequently, when the pulses travel through the waveguide 12, their relative timing difference changes. If the two pulses are initially arranged in a way that, after propagating through half the device, they temporally overlap at point 18, which is considered to be the "point of symmetry" of the operation, then this overlap point 18 corresponds to the zero-crossing of the cross correlator 10. Under this arrangement, when the two pulses arrive at the output end 16 of the waveguide 12, they will have the same time delay as they had at the input end 14, but now with a sign reversal.

Two embodiments of the background-free balanced optical cross correlator 10 are shown in FIGS. 1 and 3. The cross correlator 10 can be monolithically integrated into a semiconductor platform (e.g., into a silicon-on-silica wafer with semiconductor structures and conductive pathways) and can be made via complementary metal-oxide-semiconductor (CMOS) fabrication technology or made in other platforms.

The embodiment of FIG. 1 operates based on two-photon absorption. The optical waveguide 12 is sandwiched between an n-type semiconductor 20 (e.g., silicon doped with phosphorous) and a p-type semiconductor 22 (e.g., silicon doped with boron or aluminum) on each of a first (left) and second (right) side of the waveguide point of symmetry 18. The n-type and p-type semiconductors include first and second sections 20', 20" and 22', 22", respectively, on opposite sides of the point of symmetry 18. The intersection between the p-type region and the n-type region can be inside the waveguide region 12 or outside the waveguide region 12. Each of these waveguide and semiconductor configurations form a p-n junction photodiode 26. Further, there can be an intrinsic region (the so called "i" region) between the p-type semiconductor and the n-type semiconductor, forming a p-i-n photodiode. One or both of the boundaries between the i-type and the n-type as well as the i-type and the p-type can be inside the waveguide region 12 or outside the waveguide region 12. The p-n junction, the p-i junction, and the n-i junction can be made horizontally, vertically or at an angle.

This p-n photodiode or p-i-n photodiode can be fabricated in many different forms. One simple example is the structure shown in FIG. 9 of Ansheng Liu, et al., "Optical Amplification and Lasing by Stimulated Raman Scattering in Silicon Waveguides", Journal of Lightwave Technology, Vol. 24, 1440-1455 (2006). More advanced configurations can be made, such as the structure shown in FIG. 3 of Michael Watts, et al., "Low Voltage, Compact, Depletion Mode, Silicon, Mach Zehnder Modualtor" Journal of Selected Topics in Quantum Electronics, Vol. 16, 159-164 (2010), or the structure shown in FIG. 2 of Anatol Khilo, et al., "Broadband linearized silicon modulator", Optics Express, Vol. 19, 4485-4500 (2011).

The photodiode 26/28 generates currents or voltages that are transmitted to a balanced receiver 34 in an electronic detection system. The balanced receiver 34 includes a balanced photo-detector that generates a difference output 36 in the form of an electric current or voltage output 36 that is the difference of the currents or voltages from the first photodiode 26 and from the second photodiode 28. The difference current or voltage output 36 can be obtained by connecting through an electrically conducting pathway the first p-type semiconductor 22' to the second n-type semiconductor 20". Alternatively, the difference current or voltage output 36 can be obtained by connecting through an electrically conducting pathway the first n-type semiconductor 20' to the second p-type semiconductor 22". In particular embodiments, as shown in FIG. 1, the balanced receiver 34 can further include an internal trans-impedance differential amplifier 30 that generates, via its configuration, a difference output voltage 36 that is a function of the difference of the two currents from the photodiodes, which are separately directed through electrically conducting pathways to two separate inputs of the trans-impedance differential amplifier 30.

Figure 2:
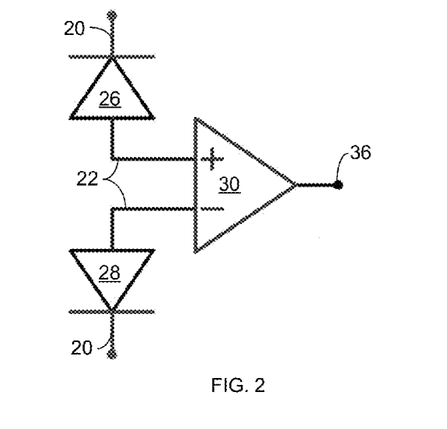
FIG. 2 provides a circuit diagram for the photo-receiver of FIG. 1.
Figure 5:
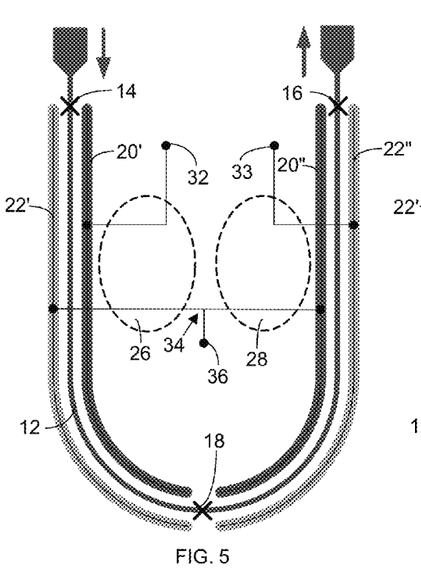
FIG. 5 is a partially schematic illustration of an unamplified semiconductor balanced optical cross correlator based on two-photon absorption.

A circuit diagram for the photo-detector of FIG. 1 is provided in FIG. 2. With more overlap between optical signals in the waveguide, increased current is generated by the photodiode 26/28. The electronic detection system can also include a bias voltage source 32 ($V_{bias}$) coupled with and providing a voltage to the semiconductors 20/22. Sharing the same bias source 32 between the two photodiodes 26 and 28 is, however, only for illustrative purposes and not a necessary condition. Similar to what is shown in FIG. 5, separate biases 32 and 33 can also be used in FIGS. 1, 3, 7, and 16. Generated carriers are swept away by the p-n junction or the p-i-n junction as they are generated inside the waveguide 12 and transmitted via the semiconductors 20/22 through respective conductive pathways (formed of an electrically conductive material, such as copper) to the balanced receiver 34.

The amplifier 30 can be, for example, any of the following three different types: (1) a transimpedance amplifier that takes the electric current and converts it into an electric voltage with some amplification throughout this process; (2) a current amplifier, where the inputs and outputs are both electric currents; (3) a voltage amplifier, wherein if the photodiode is terminated by a resistor (e.g., a 50-ohm resistor), then current is immediately converted to voltage; and then a voltage amplifier can be used to boost the signal.

The output signal 36 can be then further amplified. With or without this further amplification, the output signal 36 can be used in analog domain. Alternatively, the output signal 36 can also be digitized using an analog-to-digital (A/D) converter. Some or all of these functionalities can be hybridly integrated, co-packaged, or performed in separate packages.

In other embodiments, the balanced photoreceiver 34 can produce an unamplified output difference current 36 by directing an unamplified difference current to a resistor through an electrically conductive pathway. In each configuration, the current or voltage output 36 can be either differential or single-ended.

Figure 4:
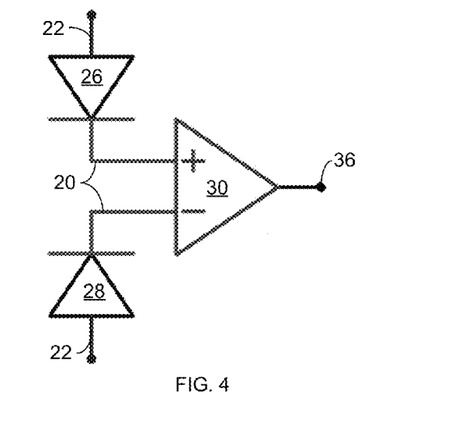
FIG. 4 provides a circuit diagram for the photo-receiver of FIG. 3.

The embodiment of FIG. 3 operates based on second-harmonic generation or sum-frequency generation. In this embodiment, the n-type and p-type semiconductor regions 20 and 22 are much shorter and are positioned in sections 20' and 22" just before the point of symmetry 18 and in sections 20" and 22" just before the output end 16 of the waveguide. Region 24 in the waveguide 12 between the n-type and p-type semiconductors 20 and 22 indicates the region of bandgap change so that the generated second-harmonic/sum-frequency photons are linearly absorbed and, as a result, carriers are generated. The generated carriers are then swept away by the p-n junction or by the p-i-n junction in this embodiment, as well. A circuit diagram for the photo-detector of FIG. 3 is provided in FIG. 4.

Figure 6:
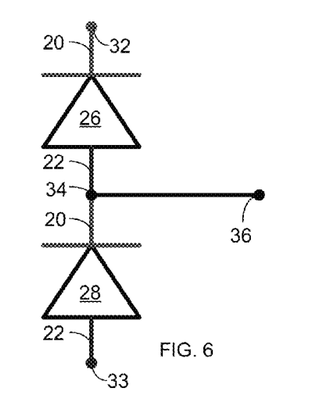
FIG. 6 provides a circuit diagram for the photo-receiver of FIG. 5.

In other embodiments, the balanced receiver 34 can be unamplified (i.e., the amplifier 30 can be omitted), as shown in FIG. 5, wherein the reverse arrangement of the photodiodes 26 and 28 generates two opposite currents such that the combination of the electric currents at a juncture en route to the difference output produces an electric current representing the difference in the magnitude of the two currents from the photodiodes 26 and 28. FIG. 6 shows a circuit diagram for the configuration shown in FIG. 5.

Figure 7:
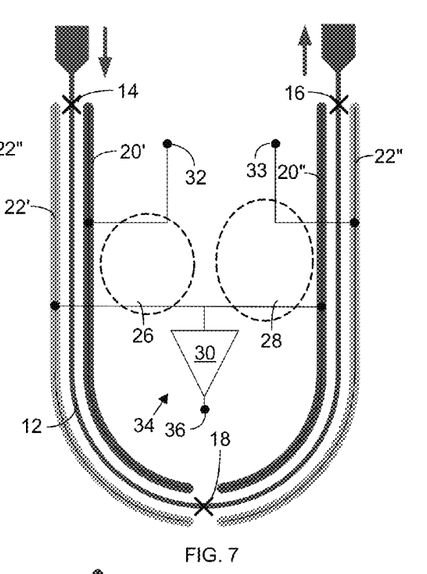
FIG. 7 is a partially schematic illustration of an unamplified semiconductor balanced optical cross correlator based on two-photon absorption, wherein the bias voltage is applied to the p-type semiconductors FIG. 8 provides a circuit diagram for the photo-receiver of FIG. 7.
Figure 8:
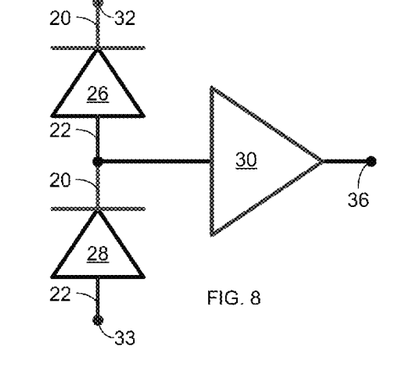

In the embodiment of FIG. 7, a difference current—which is generated at a junction between the reversely configured photodiodes 26 and 28 (as in FIGS. 5 and 6)—is further directed through a trans-impedance amplifier 30 that converts the current into a corresponding voltage as an output signal 36. In an alternative embodiment, the amplifier 30 is a current amplifier, which merely amplifies the current level. In yet another embodiment, the amplifier 30 is a voltage amplifier, and each photodiode 26/28 is terminated by a resistor (e.g., a 50-ohm resistor) that converts the electric current to voltage; the voltage amplifier 30 then boosts the signal.

Figures 9, 10:
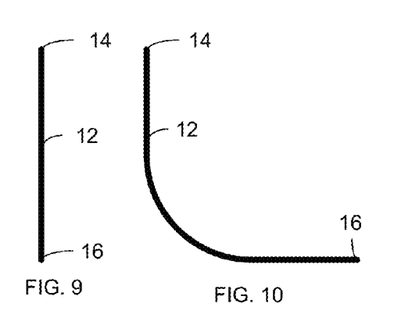
FIGS. 9-11 illustrate alternative configurations for the optical waveguide.
Figure 11:
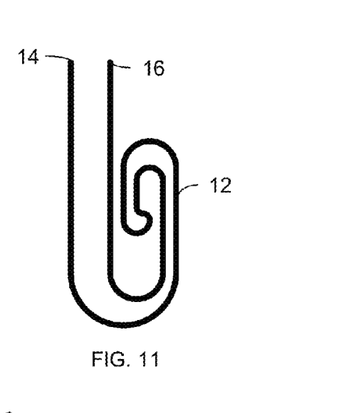
Figure 12:
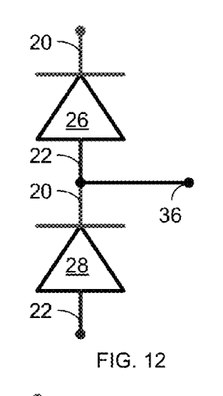
FIGS. 12-15 show circuit diagrams for some alternative arrangements of the photo-receiver.
Figure 13:
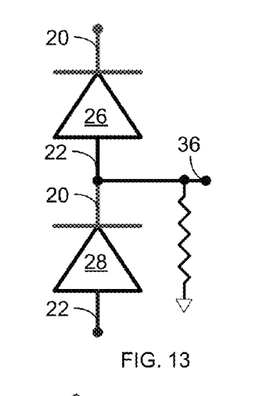
Figure 14:
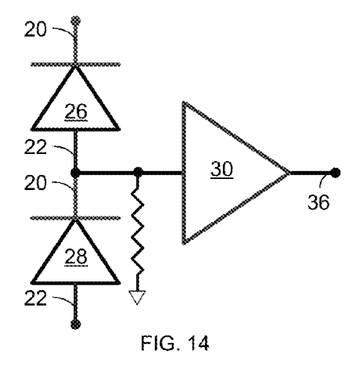
Figure 15:
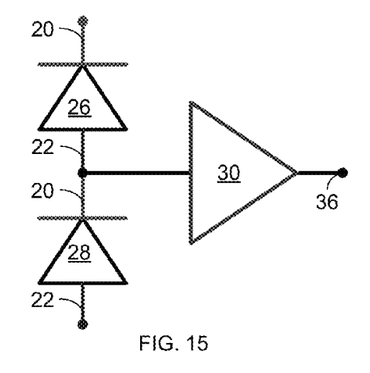

In additional embodiments, the optical waveguide 12 can take other shapes (rather than the "U" shape of FIGS. 1-8; FIGS. 9-11, respectively, show (a) a linear waveguide; (b) a 90° bend (in other embodiments, a bend at another angle can be used); and (c) a "paper clip" structure; and the n- and p-type semiconductors 20 and 22 can be reshaped accordingly to conform to the structure of the optical waveguide 12. Meanwhile, FIGS. 12-15 show circuit diagrams for some alternative arrangements of the photo-detector.

Figure 16:
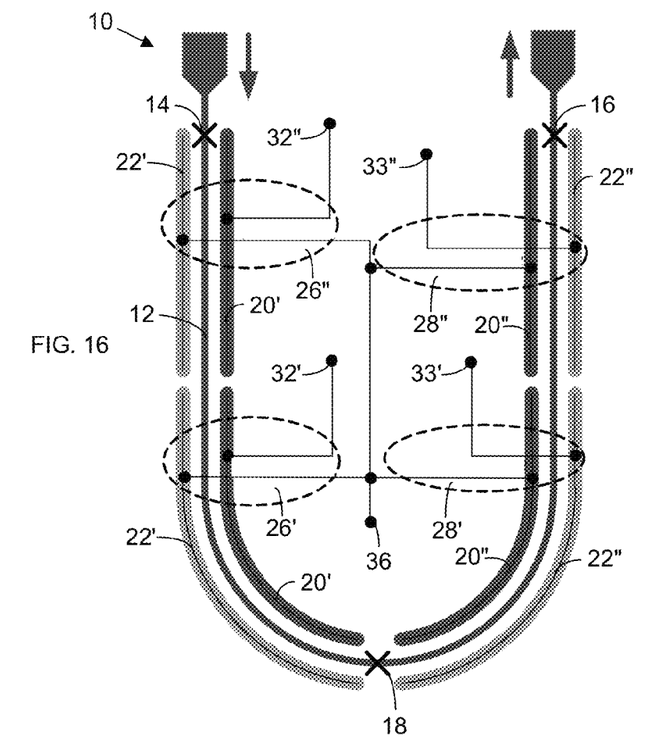
FIG. 16 is a partially schematic illustration of an unamplified semiconductor balanced optical cross correlator based on two-photon absorption utilizing a pair of diodes on each side of the waveguide's point of symmetry.
Figure 17:
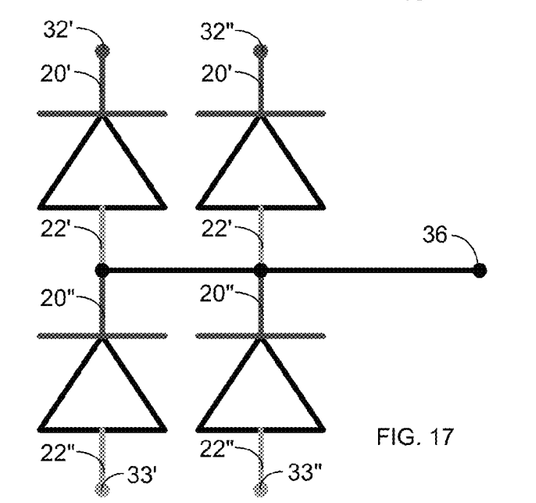
FIG. 17 provides a circuit diagram for the photo-receiver of FIG. 16.
Figure 18:
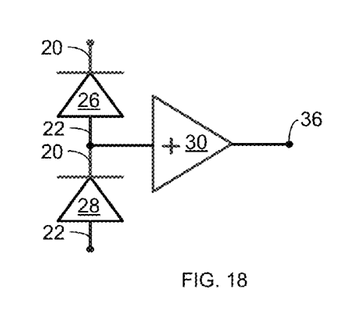
FIGS. 18-23 illustrate that when the post-detection circuitry (amplifier, etc.) has one input or even when there is no post-detection circuitry at all, the whole system can yet be accurately modeled as a two-input balanced receiver with either identical or opposite polarities.

In other embodiments, as shown in FIG. 16 and as represented in the circuit diagram of FIG. 17, two or more photodiodes 26, 28 are included on each side of the point of symmetry 18.

Figure 19:
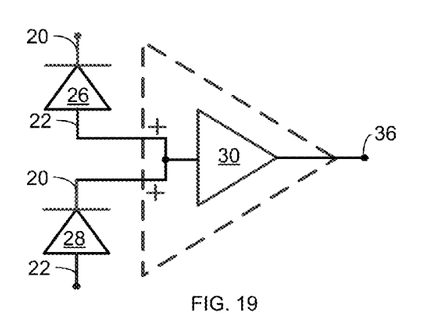
Figure 20:
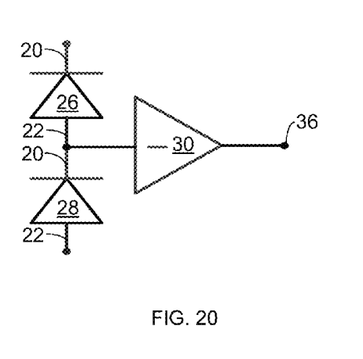
Figure 21:
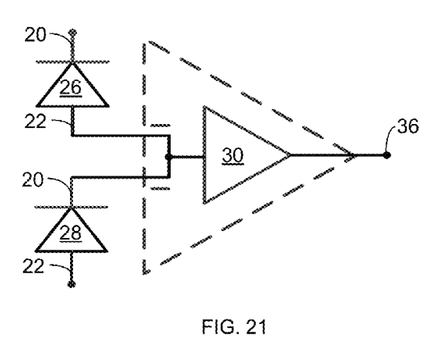
Figure 22:
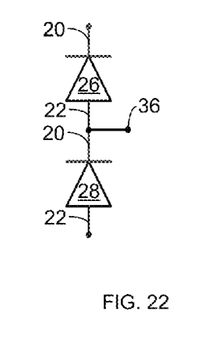
Figure 23:
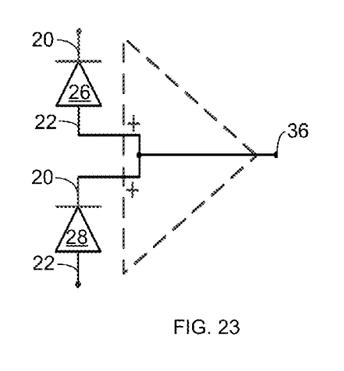

As shown in FIGS. 18-23, when the post-detection circuitry (amplifier, etc.) has one input or even when there is no post-detection circuitry at all, the whole system can yet be accurately modeled as a two-input balanced receiver with either identical or opposite polarities. FIGS. 19, 21 and 23 on the are the equivalent system model of FIGS. 18, 20 and 22, respectively. Accordingly, when the amplifier has only one input (FIGS. 18-21), or even when there is no amplifier at all (FIGS. 22 and 23), they can be modeled as a "balanced receiver" with "two inputs" of "identical" or "opposite" polarities. There is no amplifier at all in the configurations of FIGS. 22 and 23

The detection mechanisms afforded by these embodiments of the balanced optical cross correlator 10 enable femtosecond-level or attosecond-level timing detection of optical signals. The balanced optical cross correlator 10 can be made to operate in three distinct modes of operation, as exemplified in the following embodiments:

1. TPA: Two-Photon Absorption (Both Identical and Differing Wavelengths)

In a first embodiment, the material (e.g. silicon) that is used to fabricate the waveguide 12 has a bandgap that is smaller than twice the photon energy of the incident wavelengths (e.g., 1550 nm) but larger than the photon energy of both pulses. As an example, silicon has a bandgap of roughly 1100 nm, which is larger than the photon energy of a telecommunication wavelength of 1550 nm but less than twice the photon energy of 1550 nm.

As both pulses travel through the waveguide 12, they experience nonlinear absorption. For sufficiently small pulse energies (the so-called undepleted pump approximation), the nonlinear absorption is small enough so that the energies of pulses exiting the output end 16 of the waveguide 12 (as shown in FIG. 1) are almost equal to the entering pulse energies at the input end 14 of the optical waveguide 12. In this regime, the self-imposed two-photon absorption for both pulses at both sections of the waveguide [(a) extending from the input end 14 to the point of symmetry 18 and (b) extending from the point of symmetry 18 to the output end 16] will be equal; therefore, the output 36 of the balanced receiver 34 stays at zero. However, since the two input pulses are orthogonally polarized, due to the group velocity difference between the two pulses, their mutually imposed two-photon absorption will be anti-symmetric (with respect to time difference) for the two sections of the waveguide 12, resulting in different voltages generated at the photodiodes 26 and 28, thereby producing a non-zero signal 36 at the output end of the balanced receiver 34.

Since the output 36 is only non-zero when the two pulses are present, the device is background free. As an example, for telecom wavelengths of 1450-1650 nm, when the device is made of silicon (with a bandgap of 1100 nm), the mode of operation will be two-photon absorption.

2. SHG: Second-Harmonic Generation (Identical Wavelengths)

In this mode of operation, both pulses have the same wavelength. The material (e.g., GaAs or other compound III-V semiconductors, etc.) that is used to fabricate the waveguide 12 has a bandgap that is larger than twice the photon energy of the incident wavelength (for example, 2000 nm if GaAS is used for the material) and exhibits type-II phase matching for second-harmonic generation (SHG) at the wavelength of interest. The waveguide 12 in region 24 is, however, different from other regions in the waveguide 12. In region 24, the bandgap of the material is larger than the photon energy of the incident wavelength, but less than twice the photon energy of the incident wavelength. This can be easily fabricated by using different compositions of semiconductors in region 24 and other regions of the waveguide 12. Therefore, the photons of the second harmonic generated in other regions of waveguide 12 leading to region 24 are linearly absorbed in the region 24. As both pulses travel through the waveguide 12, they generate a second-harmonic signal. The phase matching required for second harmonic generation can be satisfied by different techniques, including but not limited to modal phase matching, form birefringence phase matching, quasi phase matching, Bragg grating phase matching, etc.). For sufficiently small pulse energies, the amount of energy lost by the two input pulses is not high (the so-called undepleted pump approximation), so the energies of pulses exiting the output end 16 of the waveguide 12 (as shown in FIG. 3) are almost equal to their original values at point A.

In this regime, even if type-I phase matching also coexists with type-II phase matching, the generated second harmonic signal, due to the presence of each pulse on its own, at both the first and second sections of the waveguide 12 [respectively, (a) extending from the input end 14 to the point of symmetry 18 and (b) extending from the point of symmetry 18 to the output end 16] will be equal; therefore, the output 36 of the balanced photoreceiver 34 stays at zero.

However, since the two input pulses are orthogonally polarized, due to the group velocity difference between the two pulses, their mutually imposed type-II SHG will be anti-symmetric (with respect to time difference) for the two sections of the waveguide 12, resulting in a non-zero output signal 36 from the balanced receiver 34. Since the output 36 is only non-zero when the two pulses are present, the device is background free.

3. SFG: Sum-Frequency Generation (Differing Wavelengths)

In this embodiment, the two pulses have two different wavelengths. The material (e.g., GaAs, or other compound III-V semiconductors, etc.) that is used to fabricate the waveguide 12 has a bandgap that is larger than the sum of the photon energies of the incident wavelengths (for example, for two different wavelengths of 2000 nm and 2400 nm if GaAs is used or for other possible wavelength combinations for GaAs or for other materials) and exhibits type-II phase matching for sum-frequency generation (SFG) at wavelengths of interest. The phase matching required for second harmonic generation can be satisfied by different techniques, including but not limited to modal phase matching, form birefringence phase matching, quasi phase matching, Bragg grating phase matching, etc.

As both pulses travel through the waveguide 12, they generate a sum-frequency signal. The waveguide in region 24 is, however, different from other regions of the waveguide 12. In region 24, the bandgap of the material is larger than the largest photon energy among the incident wavelengths but less than the sum of the photon energy of the incident wavelengths. This difference can be easily fabricated by using a semiconductor composition in region 24 that is different from the semiconductor composition of other regions of the waveguide 12. Consequently, the photons of the sum frequency generated in other regions of waveguide 12 leading to region 24 are linearly absorbed in the region 24.

For sufficiently small pulse energies, the amounts of energy lost by the two input pulses are modest (the so-called undepleted pump approximation), so the energies of pulses exiting the output end 16 of the waveguide 12 (as shown in FIG. 3) are almost equal to their original values at the input end 14 of the waveguide 12.

In this regime, even if type-I phase matching coexists with type-II phase matching, the generated sum-frequency signal, due to the presence of each pulse on its own, at both the first and second sections of the waveguide 12 [respectively, (a) extending from the input end 14 to the point of symmetry 18 and (b) extending from the point of symmetry 18 to the output end 16] will be equal; therefore, the output 36 of the monolithically integrated balanced photoreceiver 34 stays at zero.

However, since the two input pulses are orthogonally polarized, due to the group-velocity difference between the two pulses, their mutually imposed type-II SFG will be anti-symmetric for the two sections of the waveguide 12, resulting in a non-zero signal 36 at the output end of the balanced receiver 34. Since the output 36 is only non-zero when the two pulses are present, the device 10 is background-free.

An Exemplary Design:

In one example, using data from "Global design rules for silicon microphotonic waveguides: sensitivity, polarization and resonance tunability", Milos Popovic, Tymon Barwicz, Erich P Ippen, and Franz X. Kaertner, Conference on Lasers and Electro-Optics (CLEO) paper CTuCC1 (2006), a silicon nanowire waveguide 12 embedded in silica cladding—with a rectangular cross-section having dimensions, w=350 nm and h=300 nm—has group indices of $n_{g,TM} \approx 4.5$ and $n_{g,TE} \approx 4$. This translates to a group index contrast of $\Delta n_g/n_g \approx 2.3\%$.

If we assume typical pulse duration, $\tau$=200 fs, the length, L, of the walk-through distance in each of the first and second half sections of the cross-correlator 10 is computed using the following equation:

$$L = \frac{c}{\Delta n_g}\tau,$$

resulting in L=600 μm, which means the total length of the device is only 1.2 mm. Since the waveguides 12 have high refractive-index contrast, paper-clip architectures can easily be implemented to further shrink the required footprint, even for this small size.

For a 1% target absorption of the pulse energy in each half section of the cross correlator 10—meaning 99% of the pulse energy is preserved ($I_{out}/I_{in}$=99%), wherein the regime of the operation is well within the undepleted pump approximation—the nonlinear absorption of the waveguide in $I_{out}$=exp$(-\alpha_{TPA}L)/I_{in}$, is computed to be $\alpha_{TPA} \approx 0.17$ cm$^{-1}$. The instantaneous intensity of the pulse, $I_p$, is given by $I_p = \alpha_{TPA}/\gamma$, in which $\gamma \approx 0.7$ cm/GW is the two-photon absorption coefficient of silicon, is then calculated to be $I_p \approx 240$ MW/cm$^2$. At pulse duration, $\tau$=200 fs, and with waveguide dimensions of 350× 350 nm, this translates to pulse energies of $E_p \approx 500$ fJ.

The following design values are all readily attainable using today's technology: (a) a physical cross-sectional dimension of 350×300 nm; (b) a pulse duration of 200 fs, (c) a total length of 1.2 mm, and (d) a pulse energy of 500 fJ. Here, we used a silicon-on-silica platform as an example and demonstrated that the balanced optical cross correlator 10 can be readily brought into practice using currently available technology.

Exemplary Applications

The balanced optical cross correlator can be used as an extremely sensitive tool in precision timing measurements. The precise timing measurement will then be the basis of a diverse range of applications. For example, the balanced optical cross correlator can be used for precision jitter measurement, e.g., using technology described in J. A. Cox, A. H. Nejadmalayeri, J. Kim, and F. X. Kaertner, "Complete characterization of quantum-limited timing jitter in passively mode-locked fiber lasers," Optics Letters, Vol. 35, pp. 3522-24 (October 2010)].

In addition to size reduction and sensitivity enhancement, there can be significant economic benefit in the balanced optical cross correlator described herein. It can be monolithically integrated with an electronic detection system and fabricated in large volume using existing integrated circuit infrastructure, leading to extremely small cost, e.g., on the order of $1/device. The apparatus that was described in the J. A. Cox, et al., article, cited above, cost around $5,000. This translates to a cost reduction of three orders of magnitude.

In another example, the balanced optical cross correlator can be used for long-range timing distribution. Due to its extremely low loss, optical fiber has been increasingly used for synchronizing far-apart events. A notable example of where this kind of timing distribution is needed and where the cross correlator can be used is the billion dollar x-ray free electron laser (XFEL) facility that is currently under construction on Deutsches Elektronen Synchrotron (DESY) campus in Hamburg, Germany. The XFEL apparatus and its use to synchronize two mode-locked lasers over a distance of a few hundred kilometers is described in J. A. Cox, J. Kim, J. Chen, and F. X. Kaertner, "Sub-Femtosecond Timing Distribution of an Ultrafast Optical Pulse Train over Multiple Fiber Links," Optical Society of America (OSA), CML1 (2008), where two cross correlators are utilized for the proper operation of the instrument, and one is utilized for independent test and characterization of the performance.

The use of the balanced optical cross correlator, described herein, can lead not only to significant size reduction but also to enormous cost reduction and economic benefit as it detects differences in the timing of optical signals. In response to the detected timing differences, an electronic signal can be transmitted to a piezoelectric actuator to displace the path length (e.g., by displacing a mirror or by stretching a fiber in the optical pathway) for either optical signal to resolve the timing difference, as described in U.S. Pat. No. 7,940,390 B2.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/110^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A balanced optical cross correlator comprising:
   an optical waveguide including an input end, an output end, and a point of symmetry between the output end and the input end;
   a first photodiode including a first n-type semiconductor and a first p-type semiconductor positioned about the optical waveguide on a first side of the optical waveguide's point of symmetry;
   a second photodiode including a second n-type semiconductor and a second p-type semiconductor positioned about the optical waveguide on a second side of the optical waveguide's point of symmetry;
   a balanced receiver including a first input and a second input, with inputs having identical polarities or opposite polarities, and configured to produce an output current or voltage that reflects a difference in currents or voltages fed to the first input and to the second input;
   a first electrically conductive pathway coupling the first input of the balanced receiver with the first n-type semiconductor or with the first p-type semiconductor; and
   a second electrically conductive pathway, wherein:
   (I) in the case of the balanced receiver having identical input polarities, the second electrically conductive pathway couples the second input of the balanced receiver (a) with the second n-type semiconductor if the first electrically conductive pathway couples the first input with the first p-type semiconductor or (b) with the second p-type semiconductor if the first electrically conductive pathway couples the first input with the first n-type semiconductor; or
   (II) in the case of the balanced receiver having opposite input polarities, the second electrically conductive pathway couples the second input of the balanced receiver (a) with the second n-type semiconductor if the first electrically conductive pathway couples the first input with the first n-type semiconductor or (b) with the second p-type semiconductor if the first electrically conductive pathway couples the first input with the first p-type semiconductor.

2. The balanced optical cross correlator of claim 1, further comprising at least one laser configured to direct optical pulses into the input end of the optical waveguide directly or via an optical link.

3. The balanced optical cross correlator of claim 1, further comprising at least one bias voltage source coupled with the first and second photodiodes.

4. The balanced optical cross correlator of claim 1, further comprising an amplifier coupled with the electrically conductive pathway between the balanced receiver and each photodiode.

5. The balanced optical cross correlator of claim 1, further comprising an amplifier coupled with the balanced receiver and configured to amplify the output current or voltage.

6. The balanced optical cross correlator of claim 1, further comprising a resistor coupled with the balanced receiver and configured to produce an output difference voltage.

7. The balanced optical cross correlator of claim 1, wherein more than one photodiode is included on each side of the point of symmetry and coupled with the balanced receiver.

8. The balanced optical cross correlator of claim 1, wherein the balanced receiver is configured to produce a differential output or is configured to produce a single-ended output.

9. The balanced optical cross correlator of claim 1, further comprising an intrinsic region between each paired n-type and p-type semiconductor.

10. The balanced optical cross correlator of claim 1, wherein at least one of the n-type and p-type semiconductors fully covers the optical waveguide's cross section.

11. The balanced optical cross correlator of claim 1, wherein at least one of the n-type and p-type semiconductors partially covers the optical waveguide's cross section.

12. The balanced optical cross correlator of claim 1, wherein at least one of the n-type and p-type semiconductors does not overlap with the optical waveguide's cross section.

13. The balanced optical cross correlator of claim 1, wherein at least one of the n-type and p-type semiconductors further comprises a section of lightly doped semiconductor (n- or p-).

14. The balanced optical cross correlator of claim 1, wherein at least one of the n-type and p-type semiconductors further comprises a section of highly doped semiconductor (n+ or p+).

15. The balanced optical cross correlator of claim 1, wherein at least one of the n-type semiconductor further comprises a section of extremely doped semiconductor (n++ or p++).

16. The balanced optical cross correlator of claim 1, wherein the n-type semiconductor is separated from the p-type semiconductor by an intrinsic region.

17. The balanced optical cross correlator of claim 16, wherein the intrinsic semiconductor fully covers the optical waveguide's cross section.

18. The balanced optical cross correlator of claim 16, wherein the intrinsic semiconductor only partially covers the optical waveguide's cross section.

19. The balanced optical cross correlator of claim 16, wherein the intrinsic semiconductor does not overlap with the optical waveguide's cross section.

* * * * *